US006981865B2

(12) United States Patent
Kobayashi

(10) Patent No.: US 6,981,865 B2
(45) Date of Patent: Jan. 3, 2006

(54) CATALYST COMBUSTION SYSTEM, FUEL REFORMING SYSTEM, AND FUEL CELL SYSTEM

(75) Inventor: Katsuya Kobayashi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 903 days.

(21) Appl. No.: 09/784,197

(22) Filed: Feb. 16, 2001

(65) Prior Publication Data

US 2001/0018141 A1 Aug. 30, 2001

(30) Foreign Application Priority Data

Feb. 18, 2000 (JP) ........................... P2000-041194

(51) Int. Cl.
*F23C 11/11* (2006.01)
*H01M 8/06* (2006.01)

(52) U.S. Cl. ........................... 431/7; 431/170; 431/60; 431/61; 431/62; 429/20; 422/198

(58) Field of Classification Search .................... 431/7, 431/170, 326, 329, 60, 61, 62; 60/723, 724, 60/737, 739, 746, 747; 429/20; 422/198
See application file for complete search history.

(56) References Cited

U.S. PATENT DOCUMENTS

| | | | | |
|---|---|---|---|---|
| 3,938,326 A * | 2/1976 | DeCorso et al. | .............. | 60/723 |
| 4,534,165 A * | 8/1985 | Davis, Jr. et al. | ............. | 60/778 |
| 5,361,586 A * | 11/1994 | McWhirter et al. | ........... | 60/737 |
| 5,941,697 A | 8/1999 | Chaouki et al. | | |

FOREIGN PATENT DOCUMENTS

| | | |
|---|---|---|
| DE | 19755813 | 7/1999 |
| EP | 0 476 610 | 12/1994 |
| JP | 60-205127 | * 10/1985 |
| JP | 63-197814 | * 8/1988 |
| JP | 06-137522 | * 5/1994 |
| JP | 2 533616 | 6/1996 |
| WO | WO 96/41991 | * 12/1996 |

OTHER PUBLICATIONS

Patent Abstracts of Japan, Unexamined Applications, Sec. E, Sec. 904, vol. 14. No. 142, p. 23.

* cited by examiner

*Primary Examiner*—Carl D. Price
(74) *Attorney, Agent, or Firm*—Foley & Lardner LLP

(57) ABSTRACT

A catalyst combustor (11) includes an inner catalyst combustion portion (20) connected to a substitute fuel supply line (LS21, 12, 16) and a substitute oxidizer supply line (LS22, 13), an outer catalyst combustion portion (40) connected to an effluent fuel supply line (LS23, 14) and an effluent oxidizer supply line (LS24, 15), and a fluid communication portion (60) connecting the inner catalyst combustion portion (20) and the outer catalyst combustion portion (40) to each other, and has a fixed relationship provided among a fluid resistance ($R_2$) of the inner catalyst combustion portion (20), a fluid resistance ($R_4$) of the outer catalyst combustion portion (40), and a fluid resistance ($R_6$) of the fluid communication portion (60), whereby substantially a warming catalyst combustion is caused to occur simply in the inner catalyst combustion portion (20), and a regular catalyst combustion is caused to occur in the inner catalyst combustion portion (20) and the outer catalyst combustion portion (40).

16 Claims, 6 Drawing Sheets

CATALYST COMBUSTION SYSTEM, FUEL REFORMING SYSTEM, AND FUEL CELL SYSTEM

BACKGROUND OF THE INVENTION

The present invention relates to a catalyst combustion system, a fuel reforming system using the catalyst combustion system, and a fuel cell system using the fuel reforming system.

There has been disclosed in Japanese Patent Publication No. 2533616 a catalyst combustor for supplying a heat medium for use at a fuel reformer to reform a fuel to be used in a fuel cell.

The catalyst combustor is adapted under assistance of a catalyst to perform a catalyst combustion of "a reformed fuel containing hydrogen that is effluent, as it is unused, at a cathode (a fuel electrode) of the fuel cell" (hereafter sometimes called "effluent fuel") with "a gaseous fluid containing oxygen that is effluent, as it is unused, at an anode (an oxidizer electrode) of the fuel cell" (hereafter sometimes called "effluent oxidizer"), to provide a hot gas containing products of the catalyst combination, as the above-noted heat medium.

In such a regular run of a fuel cell system including the catalyst combustor, the fuel reformer, and the fuel cell, both effluent fuel and effluent oxidizer are available from the fuel cell for use at the catalyst combustor, and a heat medium is available therefrom.

SUMMARY OF THE INVENTION

In startup of the fuel cell system, however, the fuel cell has neither effluent fuel nor effluent oxidizer, and the catalyst combustor needs combination of a substitute fuel and a substitute oxidizer to be supplied in controlled quantities and timing for a catalyst combustion therein, to thereby provide an adequate heat medium for use at the fuel reformer.

The conventional catalyst combustor is thus provided with a set of necessary valves for individually opening and closing four fluid supply lines (effluent fuel supply line, effluent oxidizer supply line, substitute fuel supply line, and substitute oxidizer supply line), and a set of necessary actuators to be controlled for individual operations of the valves. The actuators have their weights and costs, and occupy spaces, in addition to the complexity of control system.

The present invention is made with such points in view. It therefore is an object of the present invention to provide: a catalyst combustion system in which a catalyst combustor can be supplied with necessary quantities of fuel and oxidizer for a catalyst combustion to provide an adequate heat medium in a stamp as well as in a regular run, without provision of conventional sets of valves and actuators, that is, with reduced numbers of valves and actuators; a fuel reforming system using the catalyst combustion system; and a fuel cell system using the fuel reforming system.

To achieve the object, according to an aspect of the invention, there is provided a catalyst combustion system comprising a closable first fuel supply line which supplies a fluid containing a first fuel, a closable first oxidizer supply line which supplies a fluid containing a first oxidizer for the first fuel to be combustible therewith under assistance of a catalyst, a second fuel supply line which supplies a fluid containing a second fuel different from the first fuel, a second oxidizer supply line which supplies a fluid containing a second oxidizer for the second fuel to be combustible therewith under assistance of the catalyst, and a catalyst combustor configured to alternately perform a first catalyst combustion between the first fuel and the first oxidizer and a second catalyst combustion between the second fuel and the second oxidizer, and to supply as a thermal medium a fluid containing one of a combustion product of the first catalyst combustion and a combustion product of the second catalyst combustion. The catalyst combustor comprises a first catalyst combustion portion connected to the first fuel supply line and the first oxidizer supply line, a second catalyst combustion portion connected to the second fuel supply line and the second oxidizer supply line, and a fluid communication portion connecting the first catalyst combustion portion and the second catalyst combustion portion to each other, and has a fixed relationship provided among a fluid resistance of the first catalyst combustion portion, a fluid resistance of the second catalyst combustion portion, and a fluid resistance of the fluid communication portion, whereby substantially the first catalyst combustion is caused to occur simply in the first catalyst combustion, and the second catalyst combustion is caused to occur in the first catalyst combustion portion and the second catalyst combustion portion.

According to another aspect of the invention, there is provided a fuel reforming system including a fuel reformer configured to reform a fuel using the heat medium of a catalyst combustion system according to the previous aspect.

According to another aspect of the invention, there is provided a fuel reforming system including a fuel reformer configured to reform a fuel using the heat medium of a catalyst combustion system according to the previous aspect.

According to still another aspect of the invention, there is provided a fuel cell system including a fuel cell having a fuel electrode configured to consume the reformed fuel of a fuel reforming system according to the previous aspect.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
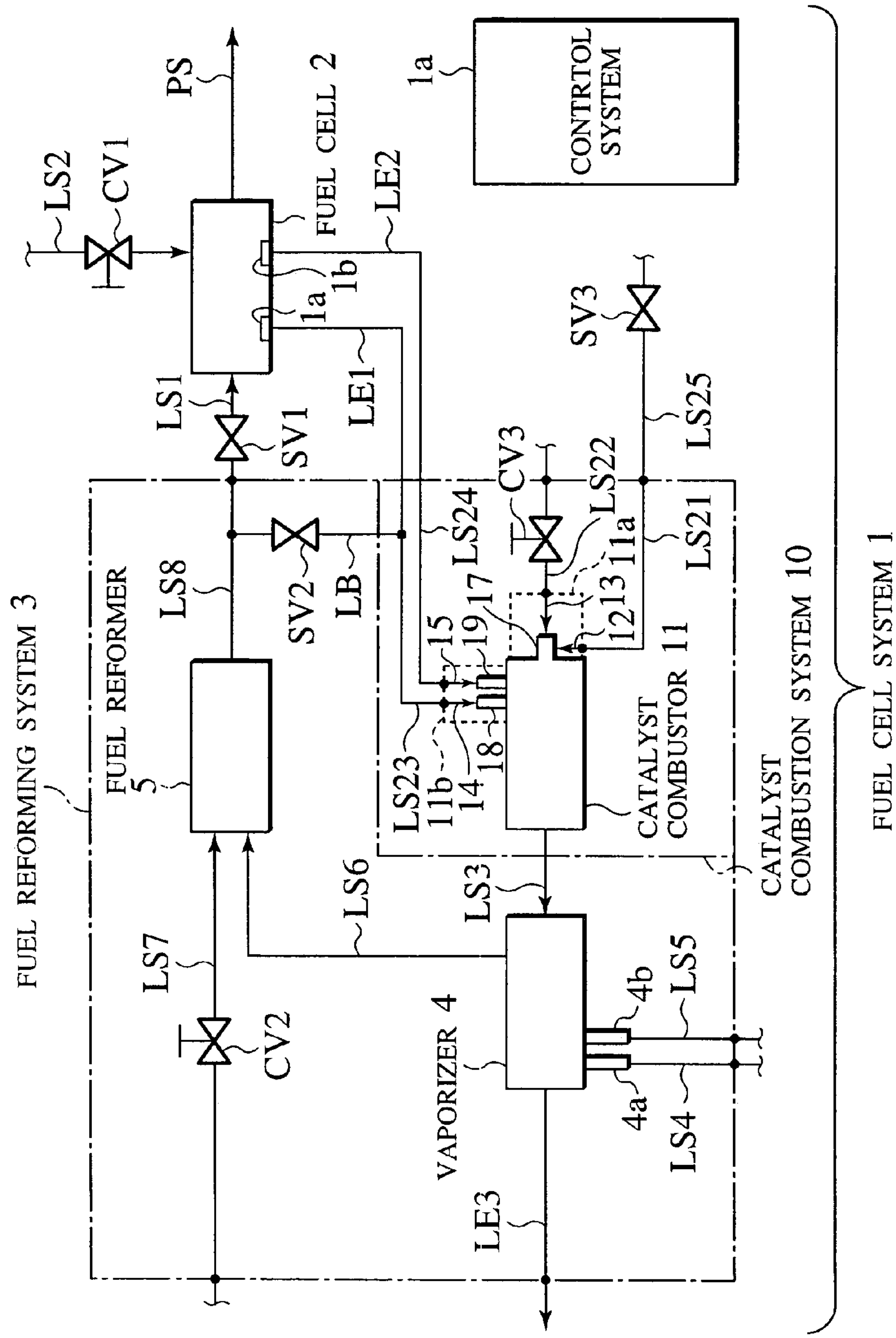
FIG. 1 is a block diagram of a fuel cell system including a fuel reforming system having a catalyst combustion system according to an embodiment of the invention.

There will be detailed below the preferred embodiments of the present invention with reference to the accompanying drawings. Like members are designated by like reference characters.

FIG. 1 shows in block diagram an entirety of a fuel cell system 1 according to a first embodiment of the invention. The fuel cell system 1 is constituted with a fuel cell 2, a fuel reforming system 3, and a control system 1*a* which controls various actions of operative components, such as actions of associated valves and drives, as necessary for startup (or warming) and regular operations of the fuel cell system 1, via unshown signal and power supply connections. It is noted that the startup operation should be as short as practicable.

As a gaseous fluid containing hydrogen as a fuel, a reformed fuel is supplied from the fuel reforming system 3 to the fuel cell 2, via a reformed fuel supply line LS1. This supply line LS1 has a shutoff valve SV1, which is close in the startup operation of the fuel cell system 1 and open in the regular operation of the system 1. As a gaseous fluid containing oxygen as an oxidizer, fresh air is supplied from an unshown air source to the fuel cell 2, via an oxidizer supply line LS2. This supply line L2 has a flow or pressure control valve CV1.

In the regular operation of the fuel cell system 1, the fuel cell 2 generates electric power to be output via a power supply line PS. For the electric power generation, hydrogen in the reformed fuel is consumed at an anode 1*a* (fuel electrode), and oxygen in the fresh air is consumed at a cathode 1*b* (oxidizer electrode). The fuel cell 2 has two effluent lines: an effluent fuel line LE1 connected to a gas collecting region of the anode 1*a,* where it receives a gaseous fluid containing hydrogen, as an effluent fuel; and an effluent oxidizer line LE2 connected to a gas collecting region of the cathode 1*b,* where it receives a gaseous fluid containing oxygen, as an effluent oxidizer.

The fuel reforming system 3 includes a vaporizer 4, a fuel reformer 5, and a catalyst combustion system 10.

The vaporizer 4 has an incorporated heat exchanger (not shown) provided with a fuel injector 4*a* and a water injector 4*b*. The heat exchanger has heating paths which are connected at their inlet ends to a heat medium supply line LS3 and at their outlet ends to an effluent fluid line LE3. The fuel injector 4*a* receives a liquid fuel, such as methanol, from an unshown fuel source via a fuel supply line LS4, and injects atomized fuel as a fuel to be vaporized and reformed. The water injector 4*b* receives pure water from an unshown water source via a water supply line LS5, and injects atomized water. The atomized fuel and atomized water are injected into a heated region of the heat exchanger, where they are mixed and vaporized by heat from streams of a heat medium in the heating paths. Then, a vaporized fuel as a mixture of heated fuel vapor and steam is conducted from the heated region of the heat exchanger, into a vaporized fuel supply line LS6.

The vaporized fuel supply line LS6 is connected to the fuel reformer 5. Further, an air supply line LS7 having a flow or pressure control valve CV2 is connected between the before-mentioned air source and the fuel reformer 5. The vaporized fuel from the supply line LS6 is mixed with air from the supply line LS7 and cracked in the fuel reformer 5, to produce "a gaseous fluid containing a sufficient amount of hydrogen, as a hydrogen-rich adequate reformed fuel" (called "reformed fuel" as used herein) to be conducted along a reformed fuel supply line LS8. This supply line LS8 is bifurcate to be connected on one way to the before-mentioned reformed fuel supply line LS1, and on the other way to a reformed fuel bypass line LB that has a shutoff valve SV2, which is open in the startup operation of the fuel cell system 1 and close in the regular operation of the system 1, in an effectively warmed phase in the startup operation, the reformer 5 produces an inadequate reformed fuel having a gradually increasing but insufficient amount of hydrogen, which is conducted through the bypass line LB, as an effluent fuel in a sense.

The catalyst combustion system 10 has a catalyst combustor 11, a substitute fuel supply line LS21, a substitute oxidizer supply line LS22, an effluent fuel supply line LS23, and an effluent oxidizer supply line LS24.

The substitute fuel supply line LS21 is connected to a liquid fuel supply line LS25, which supplies "a liquid substitute fuel" from the before-mentioned fuel source, and has a shutoff valve SV3, which is open in the startup operation of the fuel cell system 1 and close in the regular operation of the system 1. The substitute oxidizer supply line LS22 is connected to the before-mentioned air source, and supplies air to be a gaseous fluid containing oxygen, as a "substitute oxidizer", and has a flow or pressure control valve CV3. Note that the control valves CV1 to CV3 are controllable to their close positions.

The effluent fuel supply line LS23 is simply connected to the effluent fuel line LE1 and, on the way, to the reformed fuel bypass line LB, so that an effluent fuel is supplied therethrough in the effectively warmed phase in the startup operation of the fuel cell system 1, as well as in a sufficiently warmed phase substantially corresponding to an interval of the regular operation of the system 1. The effectively warmed phase and the sufficiently warmed phase will sometimes be collectively called "a warmed phase", which follows a warming phase. The effluent oxidizer supply line LS24 is simply connected to the effluent oxidizer line LE2, so that an effluent oxidizer is supplied therethrough while air is supplied from the supply line LS2. It is noted that the effluent fuel supply line LS23 and the effluent oxidizer supply line LS24, as well as the effluent fuel line LE1 and the effluent oxidizer line LE2, have no valves to be actuated for changeover between the startup operation and the regular operation of the fuel cell system 1.

Figure 2:
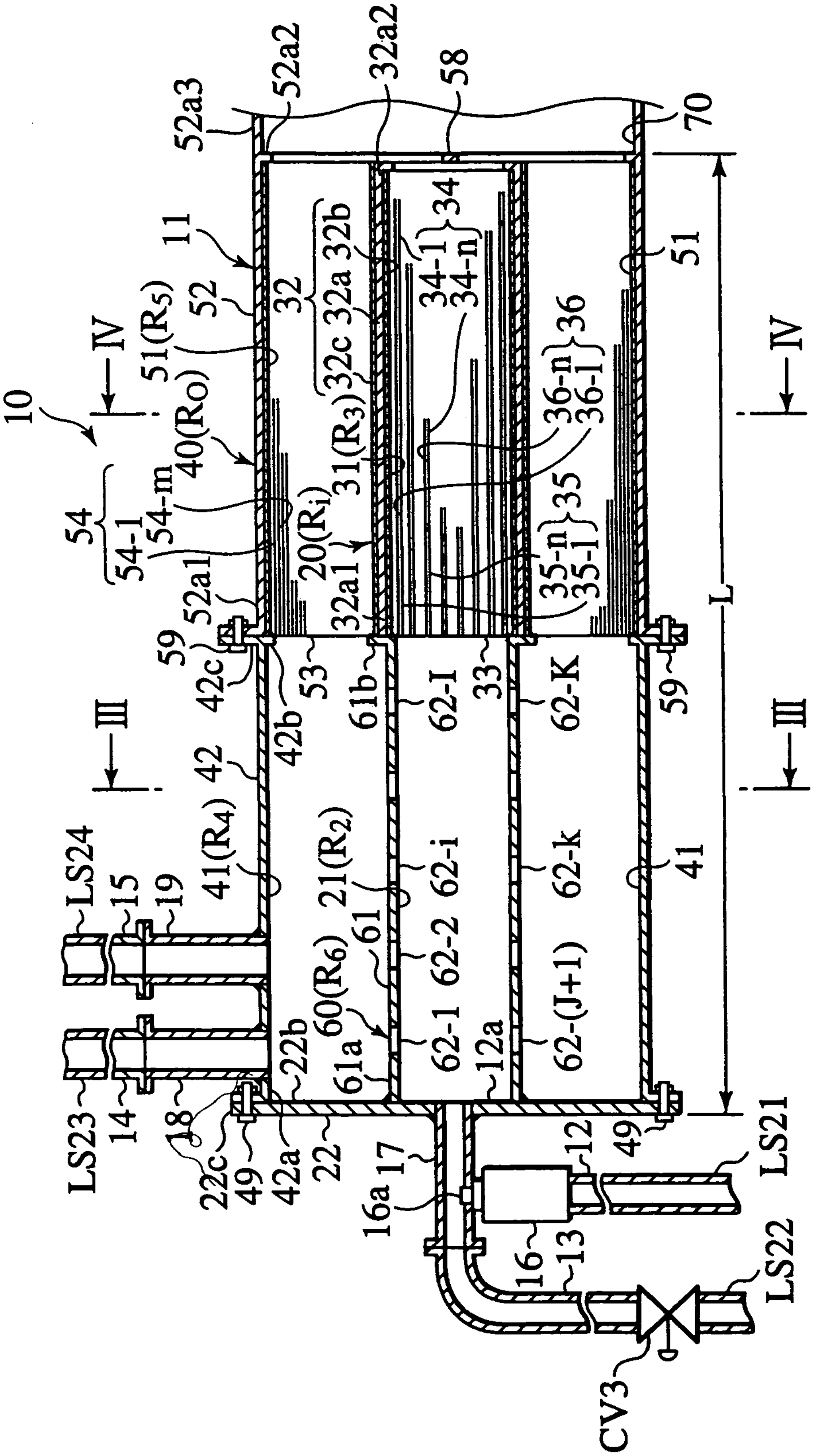
FIG. 2 is a longitudinal section of a catalyst combustor of the catalyst combustion system of FIG. 1.

The catalyst combustor 11 is provided with a substitute fluid connecting piping unit 11*a* and an effluent fluid connection piping unit 11*b*. In the piping units 11*a* and 11*b,* as shown in FIG. 2, the four supply lines LS21, LS22, LS23, and LS24 have their fluid outlet pipes: an outlet pipe 12 provided at a downstream end of the supply line LS21 for supplying a substitute fuel in the startup operation of the fuel cell system 1; an outlet pipe 13 provided at a downstream end of the supply line LS22 for supplying a gaseous substitute oxidizer in the startup operation; an outlet pipe 14 provided at a downstream end of the supply line LS23 for supplying a gaseous effluent fuel in the above-noted warmed phase; and an outlet pipe 15 provided at a downstream end of the supply line LS24 for supplying a gaseous effluent oxidizer in the regular operation of the system 1. It is noted that both connection piping units 11*a* and 11*b* have no valves to be actuated for changeover between the startup operation and the regular operation of the fuel cell system 1.

On the other hand, the catalyst combustor 11 has three fluid inlet tubes welded thereto: an inlet tube 17 simply connected to the outlet pipe 13; an inlet tube 18 simply connected to the outlet pipe 14 for introduction of the effluent fuel; and an inlet tube 19 simply connected to the outlet pipe 15 for introduction of the effluent oxidizer.

The outlet pipe 12 has at its downstream end a fuel injector 16 joined to the inlet tube 17, by inserting its atomizing tip 16*a* into the tube 17. While the supply line LS22 supplies the gaseous substitute oxidizer to be simply let through the outlet pipe 13 into the inlet tube 17, a liquid substitute fuel supplied from the supply line LS21 is let through the outlet pipe 12 and atomized at the tip 16*a* of the fuel injector 16 using air, so that "a gaseous fluid containing a system of droplets of substitute fuel" (hereafter called "gaseous substitute fuel" or "substitute fuel") is injected into streams of substitute oxidizer in the inlet tube 17, thereby having a gaseous mixture therebetween supplied to the inlet tube 17. It should be noted that this inlet tube 17 is an integral part of the catalyst combustor 11 to which a gaseous substitute fuel is supplied by a fluid supply line (LS21 with 16) constituted with the supply line LS21 having the outlet pipe 12 provided with the fuel injector 16.

As shown in FIG. 2 to FIG. 4 and FIG. 8, the catalyst combuster 11, outline in a cylindrical form, is made up by: a cylindrical inner catalyst combustion portion 20 which extends over an axial length L of the combustor 11 and has (as a space defined therein) on its upstream side a cylindrical inner gas chamber 21 and on its downstereaam side a cylindrical inner accommodation chamber 31 substantially equal in diameter to an in direct communication with the inner gas chamber 21: a cylindrical (or more specifically, annular) outer catalyst combustion portion 40 which also extends over the length L, coaxially with the inner catalyst combustion portion 20, and has (as a space defined therein) on its upstream side a cylindrical (or annular) outer gas chamber 41 and on its downstream side a cylindrical (or annular) outer accommodation chamber 51 substantially equal in inside and outside diameters to and in direct communication with the outer gas chamber 41; and a fluid communication portion 60 interposed between the inner gas chamber 21 and the outer gas chamber 41. The inner gas chamber 21 is in fluid communication with inside of the inlet tube 17 arranged for axial introduction of the mixture of substitute fuel and substitute oxidizer. The axial introduction allows for a major fraction of the mixture to smoothly flow straight to the inner gas chamber 31, at high speeds, inspiring fluids from therearound via later-described communication holes 62, having a very minor fraction of the mixture branching outside. The outer gas chamber 41 is in fluid communication with the inlet tubes 18 and 19 arranged for radial introduction of the effluent fuel and the effluent oxidizer. The radial introduction allows for major fractions of the supplied fluids to smoothly spread abut a later-described separation wall 61, with enhanced tendencies to invade through the communications holes 62 into the inner gas chamber 21, and with suppressed tendencies to flow toward the outer gas chamber 51. The inner gas chamber 21 has a small fluid resistance $R_2$ thereacross, and the outer gas chamber 41 also has a small fluid resistance $R_4$ thereacross. The inner catalyst combustion portion 20 has a smaller heat capacity than the outer catalyst combustion portion 40. It should be noted that a catalyst in concern promotes a significant catalyst combustion above a critical temperature.

Figure 3:
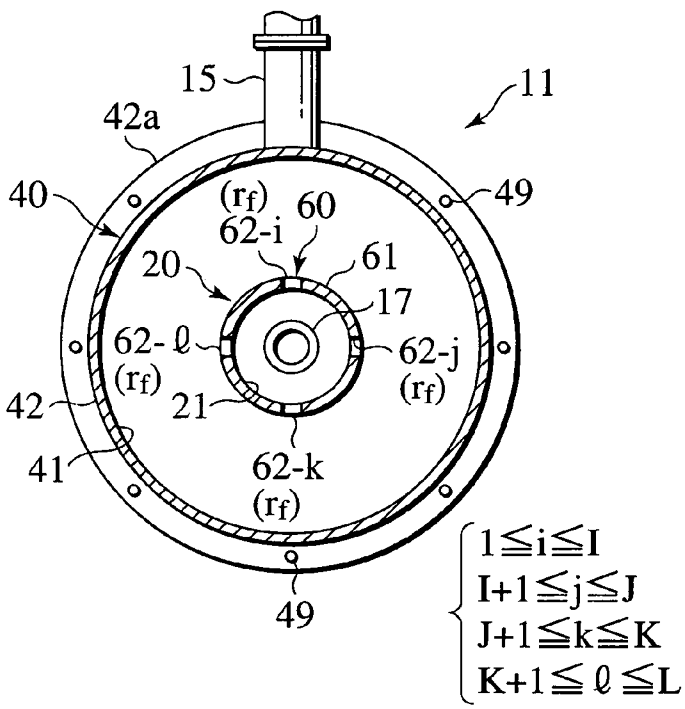
FIG. 3 is a cross section along line III—III of the catalyst combustor of FIG. 2.

As shown in FIG. 2 and FIG. 3, the fluid communication portion 60 is constituted with a fluid-containing cylindrical separation wall 61 which extends for separation between the inner and outer gas chambers 21 and 41, and has a set of axial arrays $\{62\text{-}i: 1 \leqq i \leqq I\}$, $\{62\text{-}j: I+1 \leqq j \leqq J\}$, $\{62\text{-}k: J+1 \leqq k \leqq K\}$, and $\{62\text{-}l: K+1 \leqq l \leqq L\}$ (where I, J, K, and L are given integers and i, j, k, and l are arbitrary integers in defined ranges) of fluid communications holes "62-1, 62-2, . . . , 62-i, . . . , 62-I, 62-(I+1), . . . , 62-j, . . . , 62-J, 62-(J+1), . . . , 62-k, . . . , 62-K, 62-(K+1), . . . , 62-l, . . . , 62-L" (hereafter collectively referred to "62") provided through the separation wall 61. An arbitrary hole 62 may be circular, elliptic, triangular, rectangular, polygonal, or any form else in section that can provide a necessary fluid resistance r ($1 \leqq f \leqq L$). A parallel connection of respective fluid resistances {r} of a total of L fluid communication holes 62 represents a fluid resistance $R_6$ of the fluid communication portion 60. The separation wall 61 is welded at its upstream end 61*a* to a circular central part 22*a* of a circular end plate 22 of the catalyst combustor 11, and radially outwardly flanged at its downstream end 61*b*. The inlet tube 17 is inserted and welded to the central part 22*a* of the end plate 22.

As shown in FIG. 2 to FIG. 3, the inner catalyst combustion portion 20 is constituted with: the circular end plate 22 of which the central part 22*a* cooperates with the separation wall 61 to define the inner gas chamber 21; a cylindrical heat insulating separator 32 defining the inner accommodation chamber 31; and a cylindrical substrate 33 which is accommodated to be fitted gas-tight in the accommodation chamber 31, and formed (to be meshed) in a honeycomb shape in a later-described fashion with a set of axially extending catalyst combustion path (or mesh) parts "34-1, . . . , 34-(n−1), 34-n, . . . , where n is an arbitrary integer in a range defined by a given integer N such that $1 \leqq n \leqq N$," (hereafter sometimes collectively referred to "34"). The heat insulating separator 32 is constituted with a cylindrical inner casing 32*a* which is brought into abutment at its upstream end 32*a*1 on the flanged downstream end 61*b* of the separation wall 61 and inwardly bent at its downstream end 32*a*2 for hooking or stopping the substrate 33, an inner heat insulating layer 32*b* which is formed over an inside of the cylindrical casing 32*a*, and an outer heat insulating layer 32*c* which is formed over an outside of the inner casing 32*a*.

Figure 4:
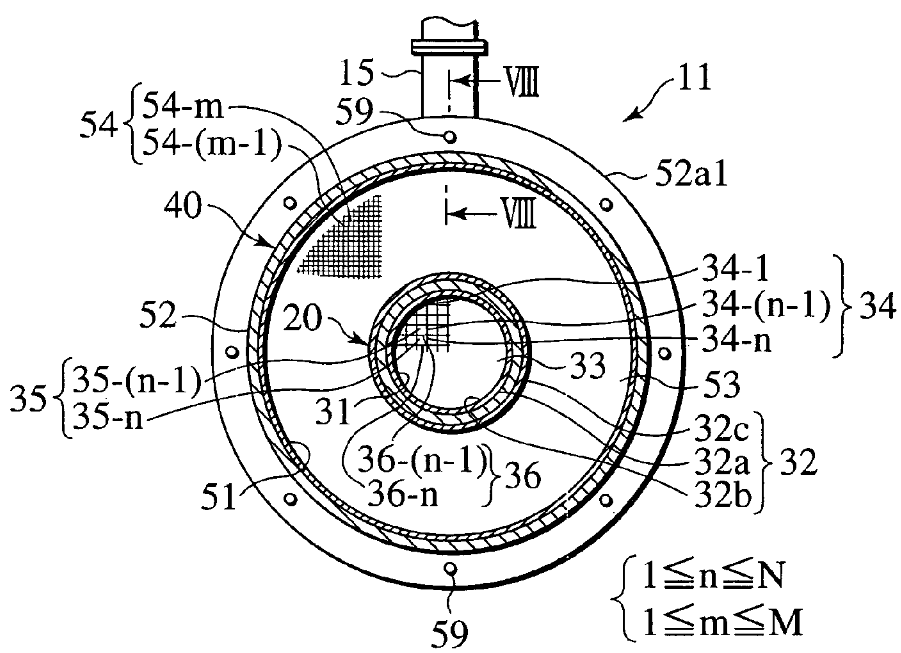
FIG. 4 is a cross section along line IV—IV of the catalyst combustor of FIG. 2.

Again as shown in FIG. 2 to FIG. 4, the outer catalyst combustion portion 40 is constituted with: a cylindrical upstream outer casing 42 cooperating with the separation wall 61 and the annular part 22*b* of the end plate 22 to define the outer gas chamber 41; a cylindrical outer case 52 cooperating with the heat insulating separator 32 to define the outer accommodation chamber 51; and a cylindrical (or annular) substrate 53 which is accommodated to be fitted gas-tight in the accommodation chamber 51, and formed (to be meshed) in a honeycomb shape in a later-described fashion with a set of axially extending catalyst combustion path (or mesh) parts "54-1, . . . , 54-(m−1), 54-m, . . . , where m is an arbitrary integer in a range defined by a given integer M such that $1 \leqq m \leqq M$ (>N or >>N)," (hereafter sometimes collectively referred to "54"). The substrate 53 has a smaller mesh than the substrate 33, or in other words, the meshing of the latter 33 is coarser or rougher than that of the former 53. The upstream outer casing 42 has at its upstream end an outward flanged part 42*a* fastened by bolts 49 to a peripheral flange 22*c* of the end plate 22, and at its downstream end an inward projected part 42*b* and an outward flanged part 42*c*. It should be noted that the heat capacity of the inner catalyst combustion portion 20 substantially depends on a heat capacity of the substrate 33, and that of the outer catalyst combustion portion 40 substantially depends on a heat capacity of the substrate 53. It also is noted that the substrate 33 has a significantly smaller heat capacity than the substrate 53.

Figure 8:
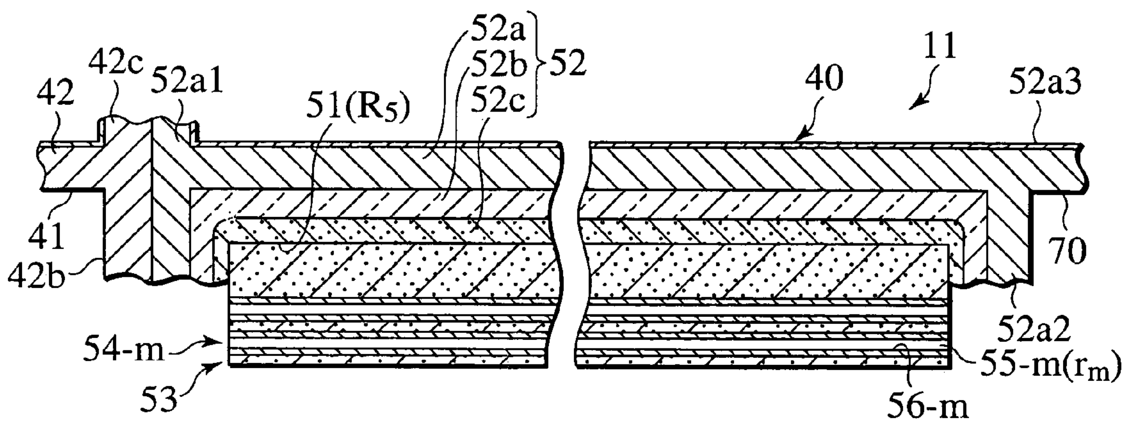
FIG. 8 shows a detailed section along line VIII—VIII of the catalyst combustor of FIG. 2, as it is common to the catalyst combustor of FIG. 5.

As best shown in FIG. 8, the outer case 52 is constituted with: a cylindrical downstream outer casing 52*a* which is integrally formed at its upstream end with an outward flanged part 52*a*1 fastened by bolts 59 (FIG. 2) to the outward flanged part 42*c* of the upstream outer casing 42 and at its downstream end with an inward projected part 52*a*2 configured to hook or stop the substrate 53 and to support a cross member 58 (FIG. 2) for stopping the heat insulating separator 32 and with a downstream extension 52*a*3 configured to define a cylindrical combustion product (heat medium) outlet space 70 to be common to the inner and outer catalyst combustion portions 20 and 40 (FIG. 2) and to be connected to the heat medium supply line LS3 (FIG. 1); a refractory mortar layer 52*b* lining over an inside of the downstream outer casing 52*a* and a corresponding region of an end face of the inward projected part 42*b* of the upstream outer casing 42; and a gas-tight filler 52*c* of heat insulating materials filled between the refractory mortar layer 52*b* and the substrate 53.

As illustrated in FIG. 8, an arbitrary catalyst combustion path part 54-m ($1 \leqq m \leqq M$) in the substrate 53 is constituted with: a corresponding straight combustion path 55-m ($1 \leqq m \leqq M$) (hereafter sometimes collectively referred to "55") axially extending as a fluid path through the substrate 53 and communicating at its upstream end with the outer gas chamber 41 and at its downstream end with the combustion product outlet space 70; and a corresponding set 56-m ($1 \leqq m \leqq M$) of films of a catalyst configured as a whole to define the combustion path 55-m with a corresponding fluid resistance $\{r_m: 1 \leqq m \leqq M\}$ thereacross. A parallel connection of respective fluid resistances $\{r_m\}$ of a total of M combustion paths 55 (or of M combustion path parts 54) represents a fluid resistance $R_5$ across the outer accommodation chamber 51 (or of the substrate 53).

Likewise, as schematically shown in FIG. 2 and FIG. 4, an arbitrary catalyst combustion path part 34-n ($1 \leqq n \leqq N$) in the substrate 33 is constituted with: a corresponding straight combustion path 35-n ($1 \leqq n \leqq N$) (hereafter sometimes collectively referred to "35") axially extending as a fluid path through the substrate 33 and communicating at its upstream end with the inner gas chamber 21 and at its downstream end with the combustion product outlet space 70; and a corresponding set 36-n ($1 \leqq n \leqq N$) of films of the above-noted catalyst configured as a whole to define the combustion path 35-n with a corresponding fluid resistance $\{r_n: 1 \leqq n \leqq N\}$ thereacross. A parallel connection of respective fluid resistances $\{r_n\}$ of a total of N combustion paths 35 (or of N combustion path parts 34) represents a fluid resistance $R_3$ across the inner accommodation chamber 31 (or of the substrate 33). The N combustion paths 34 have a greater average sectional area than the M combustion paths 54, so that an average of the fluid resistances $\{r_n\}$ of the former 34 is smaller than that of the fluid resistances $\{r_m\}$ of the latter 54. It is noted that the combustion paths 34 as well as the combustion paths 54 may be identical or different in configuration and/or size, as necessary for facilitation of manufacture or for a particular fluid condition. It is desirable to increase a proportion of effectively used catalyst in a sum of a total of N sets 36 and a total of M sets 56 of films of catalyst, in order for a capacity of catalyst combustion process to be maximized in the regular operation of the fuel cell system 1.

Referring to FIG. 2, in the catalyst combustor 11, the inner catalyst combustion portion 20 has a fluid resistance $R_1$ thereacross equivalent to a serial connection of the fluid resistance $R_2$ of the inner gas chamber 21 and the fluid resistance $R_3$ across the inner accommodation chamber 31 (or of the substrate 33), such that $R_1=R_2+R_3$. The outer catalyst combustion portion 40 has a fluid resistance $R_6$ thereacross equivalent to a serial connection of the fluid resistance $R_4$ of the outer gas chamber 41 and the fluid resistance $R_5$ across the outer accommodation chamber 51 (or of the substrate 53), such that $Ro=R_4+R_5$. The fluid resistance $R_6$ of the fluid communication portion 60 is serially connected to the fluid resistance $R_2$ or the inner gas chamber 21.

Referring to FIG. 1 to FIG. 4, the catalyst combustor 11 is configured to have fixed relationships among internal fluid resistances $\{R_1, R_0, R_2, R_3(r_n), R_4, R_5(r_m), R_6(r_t)\}$ thereof, for example such that:

$R_2<R_3$ or $R_2<<R_3$,
$R_4<R_5$ or $R_4<<R_5$,
$R_2 \propto R_4<R_6$ or $R_2 \propto R_4<<R_6$, i.e. $(R_2+R_6) \propto (R_4+R_6) \propto R_6$,
$r_n<r_m$ or $r_n<<r_m$,
$R_i<R_o$ or $R_i<<R_o$, and/or
$R_i+R_6 \propto R_o$ or $R_i+R_6=R_o$, so that, in the "startup operation" of the fuel cell system 1, substantially, a warming catalyst combustion between the substitute fuel and the substitute oxidizer is caused to occur simply in the inner catalyst combustion portion 20 (or more specifically in the substrate 33) which is low of heat capacity, i.e. without an influential or significant catalyst combustion caused between a fuel and an oxidizer conducted in the substrate 53 of the outer catalyst combustion portion 40 which is high of heat capacity, and that, in the "regular operation" of the fuel cell system 1, a regular catalyst combustion between the effluent fuel and the effluent oxidizer is caused to occur in both the inner catalyst combustion portion 20 (or more specifically in the substrate 33) and the outer catalyst combustion portion 40 (or more specifically in the substrate 53), in particular proportionally or evenly, as required.

In the warming phase of the startup operation in which the shutoff valve SV1 is close but the shutoff valve SV3 is open and the control valve CV3 is in its open position whereas the control valves CV1 and CV2 are in their close or crack-open positions as necessary and the shutoff valve SV2 is to be opened when necessary for bypassing an amount of reformed fuel, the fuel injector 16 injects and atomized substitute fuel into a flow of a supplied substitute oxidizer in the inlet tube 17, whereby a gaseous mixture therebetween is introduced into the inner gas chamber 21, where it flows downstream along the separation wall 61, and enters the substrate 33 in the inner accommodation chamber 31 with a priority, where it contacts the catalyst 36, whereby its warmer catalyst combustion is promoted, generating gaseous combustion products, which flow out of the substrate 33 and enter the outlet space 70, wherefrom they are supplied as a heat medium via the supply line LS3 to the heating side of the heat exchanger in the vaporizer 4, and discharged therefrom via the effluent line LE3. In due course in the warming phase, the vaporizer 4 may start generating a vaporized fuel to be supplied via the supply line LS6 to the fuel reformer 5. It is noted that the substitute fuel as well as the effluent fuel is combustible with the substitute oxidizer, and with the effluent oxidizer as well, under assistance of (i.e., by contact on) the catalyst 36, 56.

Although, when the gaseous mixture passes the inner gas chamber 21, a minor fraction thereof branches via the communication holes 62 of the fluid communication portion 60 into the outer gas chamber 41 and enters the substrate 53 in the outer accommodation chamber 51, the branching fraction is maintained very small by relationships (for example $R_i<R_o$ or $R_i<<R_o$) among fluid resistances such as the fluid resistance $R_6$ across the separation wall 61 and the fluid resistance $R_5$ of the substrate 53 which has fine meshes 54. As the substrate 33 which has a low heat capacity is accommodated in the heat insulating separator 32 which suppresses heat dissipation from the inner accommodation chamber 31, the catalyst 33 can be warmed in a short while. The branching fraction of gaseous mixture gradually starts a preparatory warming catalyst combustion in the substrate 53.

In the effectively warmed phase of the startup operation in which the shutoff valve SV1 is kept close and the shutoff valve SV3 is still open while the shutoff valve SV2 is opened and the control valves CV2 and CV3 are in their controlled open positions whereas the control valve CV1 may be controlled to be yet close or to a crack-open position as necessary, a significant amount of vaporized fuel is supplied to the fuel reformer 5, where it is reformed, and a significant amount of gaseous reformed fuel is conducted, via the supply line LS8 and the bypass line LB, into the effluent fuel supply line LS23, wherefrom it is supplied into the outer gas chamber 41, where it is divided into: those streams which join a minor fraction of a gaseous mixture between (a maintained amount of) substitute fuel and (an increased amount of) substitute oxidizer (as the mixture is supplied in the inner gas chamber 21 and the minor fraction is branched to the outer gas chamber 41), thus entering together with the minor fraction into the substrate 53, where they contact the catalyst 56, whereby their warming catalyst combustion is promoted, generating a gradually increasing amount of gaseous combustion products; and those streams which branch through the communication holes 62 of the fluid communication portion 60 into the inner gas chamber 21, joining the gaseous mixture therein to enter the substrate 33, where they contact the catalyst 36, whereby their enhanced warming catalyst combustion is promoted, generating an increased amount of gaseous combustion products. The respective amounts of gaseous combustion products are collected from the substrates 53 and 33 in the outlet space 70, wherefrom they are supplied as an increased amount of heat medium to the vaporizer 4. If the control valve CV1 is controlled to the crack-open position, the control valve CV3 may be set to an initial open position or controlled to a slightly wider open position.

In the regular operation, the shutoff valve SV3 is closed to stop the supply of substitute fuel and the control valve CV3 is set to its close position to control the supply of substitute oxidizer to a zero flow, whereas the control valve CV2 is set to its regular open position to supply necessary air via the supply line LS7 to the fuel reformer 5, the shutoff valve SV2 is closed to close the bypass line LB, the shutoff valve SV1 is opened to supply a sufficient reformed fuel via the supply line LS1 to the fuel cell 2, and the control valve CV1 is set to its regular open position to supply sufficient air to the fuel cell 2, so that an effluent fuel is supplied from the effluent line LE1, via the supply line LS23 and the outlet pipe 14, to the inlet tube 18 and hence to the outer gas chamber 41 of the catalyst combustor 11, and an effluent oxidizer is supplied from the effluent line LE2, via the supply line LS24 and the outlet pipe 15, to the inlet tube 19 and hence to the outer gas chamber 41 of the catalyst combustor 11, where it is mixed with the effluent fuel, forming a gaseous mixture flowing downstream along the separation wall 61. The mixture is substantially uniformly distributed about the fluid communication portion 60 and substantially evenly divided into: those streams which flow inside the outer gas chamber 41, thus entering the substrate 53, where they contact the catalyst 56, whereby their regular catalyst combustion is promoted, generating a necessary amount of gaseous combustion products; and those streams which branch through the communication holes 62 of the fluid communication portion 60 into the inner gas chamber 21, where they flow downstream to enter the substrate 33, where they contact the catalyst 36, whereby their regular catalyst combustion is promoted, generating a necessary amount of gaseous combustion products. The respective amounts of gaseous combustion products are collected from the substrates 53 and 33 in the outlet space 70, wherefrom they are supplied as a required amount of heat medium to the vaporizer 4. The even division of the mixture is effected for the catalyst 36, 56 to have a maximized processing capacity, by provision of balanced relationships (for example $R_i+R_{6=Ro}$ or $R_i+R_6=R_o$) among fluid resistances including the fluid resistances $\{r_1\}$ of the communication holes 62, the fluid resistances $\{r_n\}$ of the combustion paths 35, and the fluid resistances $\{r_m\}$ of the combustion paths 55.

The present embodiment has, among others, the following advantages:

(1) a short warming in a startup operation due to a catalyst combustion of substitute fuel in a restricted catalyst region (within 33) with a restricted heat capacity;

(2) a still shortened warming in the startup operation due to the provision of heat insulating layers 32*b*, 32*c* keeping combustion heat in a substrate 33 from escaping outside;

(3) a yet shortened warming in the startup operation due to a major fraction of a gaseous mixture flowing into the substrates 33 which is low of heat capacity;

(4) an actuator-less control allowed simply by combination of communication holes 62 and substrates 33, 53 different of mesh size;

(5) an actuator-less control in the startup operation allowed for a major fraction of a mixture of substitute fuel and substitute oxidizer to be conducted to the substrate 33 irrespective of the provision of communication holes 62, by relationships (for example $r_n<r_m$ or $r_n<<r_m$) of fluid resistances (such as $r_n$ and $r_m$); and (6) an actuator-less control in a regular operation allowed for a process capacity of catalyst 36, 56 to be maximized, by a uniform distribution and even division of a mixture of effluent fuel and effluent oxidizer that is implemented by relationships (for example $R_i+R_b=R_o+R_6=R_o$) of fluid resistances (such as $r_f$, $r_n$, $r_m$).

In the embodiment described, the inner and outer catalyst combustion portions 20 and 40 are configured as coaxial cylinders in outline. However, they may be configured in any forms else that have like relationships among internal fluid resistances to the above embodiment, as illustrated below.

Figure 5:
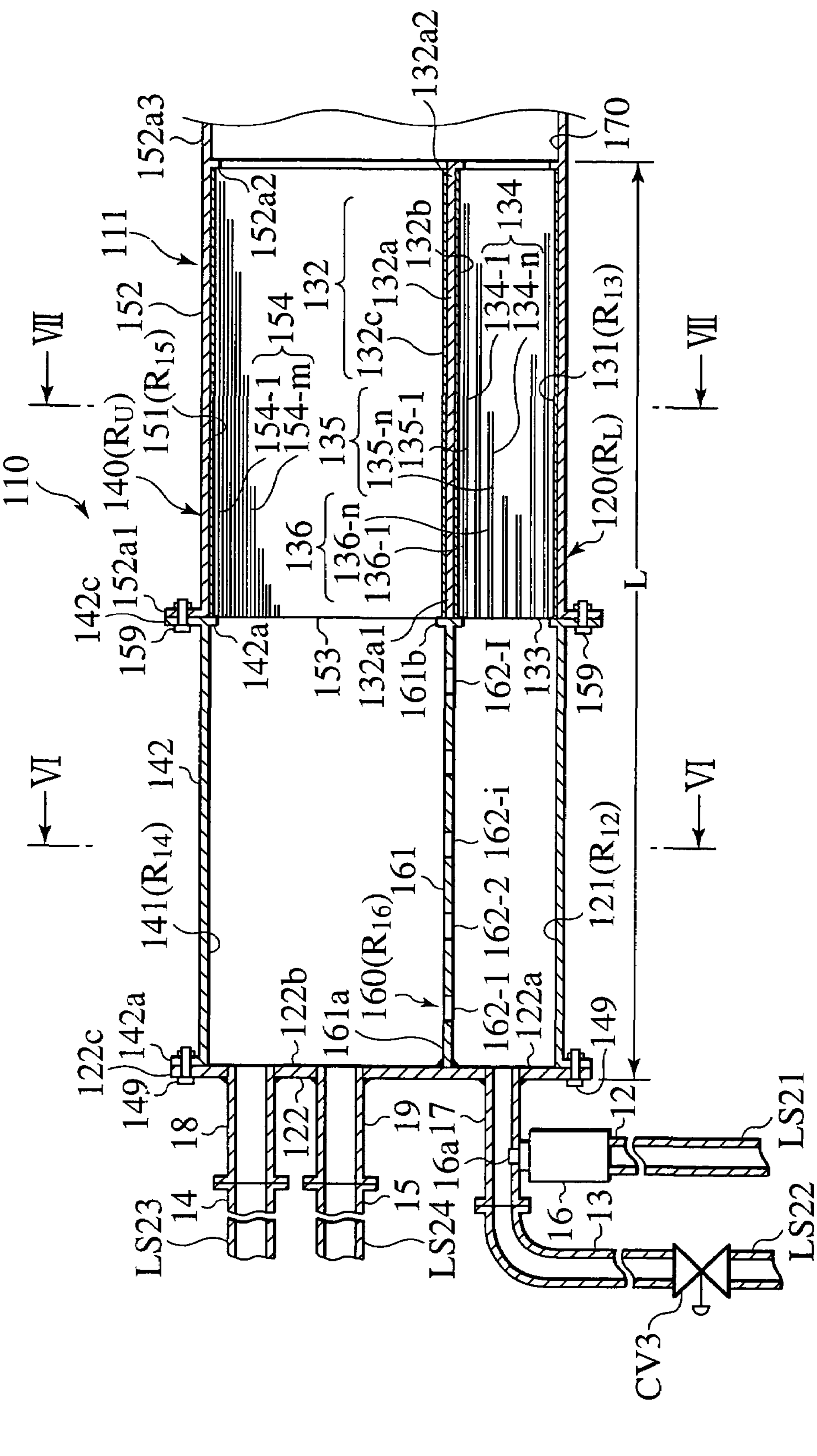
FIG. 5 is a longitudinal section of a catalyst combustor of a catalyst combustion system according to another embodiment of the invention.
Figure 6:
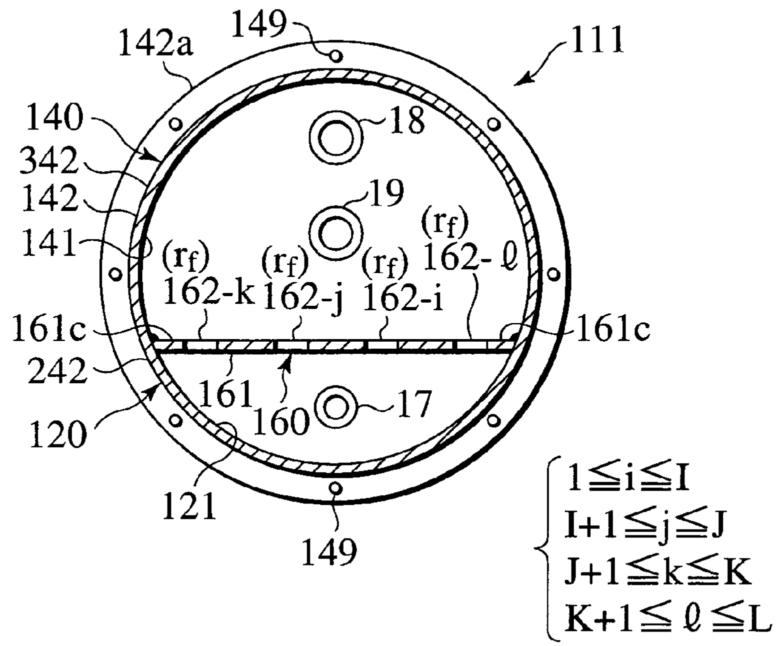
FIG. 6 is a cross section along line VI—VI of the catalyst combustor of FIG. 5.
Figure 7:
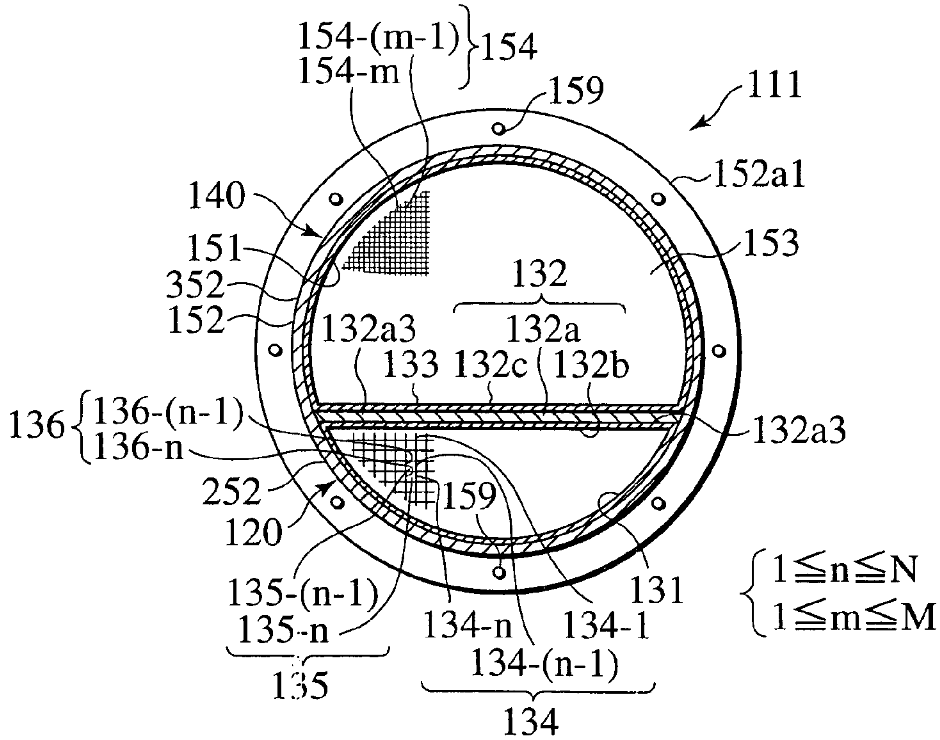
FIG. 7 is a cross section along line VII—VII of the catalyst combustor of FIG. 5.

FIG. 5 to FIG. 7 show a catalyst combustion system 110 in a fuel system 1 according to a second embodiment of the invention.

As shown in FIG. 5, the catalyst combustion system 110 has a catalyst combustor 111, a substitute fuel supply line LS21, a substitute oxidizer supply line LS22, an effluent fuel supply line LS23, and an effluent oxidizer supply line LS24. The supply lines LS21, LS22, LS23, and LS24 have their fluid outlet pipes 12, 13, 14, and 15. The catalyst combustor 111 has three fluid inlet tubes 17, 18, and 19 welded thereto. The outlet pipe 12 has at its downstream end a fuel injector 16 joined to the inlet tube 17, by inserting its atomizing tip 16*a* into the tube 17.

As shown in FIG. 5 to FIG. 7, the catalyst combustor 111, cylindrical in outline, is made up by: a lower catalyst combustion portion 120 which is outlined in the form of a "cut cylinder with a minor are closed by a chord in section" (hereafter referred to "minor are shape") and extends over an axial length L of the combustor 111 and which has (as a space defined therein) on its upstream side a lower gas chamber 121 of a minor are shape and on its downstream side a lower accommodation chamber 131 of a minor are shape substantially equal in size to and in direct communication with the lower gas chamber 121; an upper catalyst combustion portion 130 which is outlined in the form of a "cut cylinder with a major arc closed by a chord in section" (hereafter referred to "major arc shape") and extends over the length L, with its chordal bottom put on a chordal top of the lower catalyst combustion portion 120, and which has (as a space defined therein) on its upstream side an upper gas chamber 141 of a major arc shape and on its downstream side an upper accommodation chamber 151 of a major arc shape substantially equal in size to and in direct communication with the upper gas chamber 141; and a fluid communication portion 160 interposed between the lower gas chamber 121 and the upper gas chamber 141. The lower gas chamber 121 is in fluid communication with inside of the inlet tube 17 arranged for axial introduction of a mixture of a substitute fuel and a substitute oxidizer. This axial introduction allows for a major fraction of the mixture to smoothly flow straight to the lower gas chamber 131, at high speeds, inspiring fluids from thereabove via later-described communication holes 162, having a very minor fraction of the mixture branching through the communication holes 162. The upper gas chamber 141 also is in fluid communication with the inlet tubes 18 and 19 arranged for axial introduction of an effluent fuel and an effluent oxidizer to be mixed there (141). This axial introduction allows for major fractions of introduced fluids to smoothly spread over a later-described separation wall 161, with tendencies to invade through the communications holes 162 into the lower gas chamber 121 and with tendencies to flow toward the upper gas chamber 151. The lower gas chamber 121 has a small fluid resistance $R_{12}$ thereacross, and the upper gas chamber 141 also has a smaller fluid resistance $R_{14}$ thereacross. The lower catalyst combustion portion 120 has a smaller heat capacity than the upper catalyst combustion portion 140.

As shown in FIG. 5 and FIG. 6, the fluid communication portion 160 is constituted with a fluid-guiding flat rectangular separation wall 161 which extends for separation between the lower and upper gas chambers 121 and 141, and has a set of axial arrays {162-i: 1≦i≦1}, {162-j: I+1≦j≦J}, {162-k: J+1≦k≦K}, and {162-l; K+1≦l≦L} of fluid communication holes "162-i (1≦i≦I), 162-j (1+I≦j≦J), 162-k (J+1≦k≦K), and 162-l (K+1≦l≦L)" (hereafter collectively referred to "162") provided through the separation wall 161. An arbitrary hole 162 may be circular, elliptic, triangular, rectangular, polygonal, or any form else in section that can provide a necessary fluid resistance $r_s$ (1≦l≦L). A parallel connection of respective fluid resistances $\{r_1\}$ of a total of L fluid communication holes 162 represents a fluid resistance $R_{16}$ of the fluid communication portion 160. The separation wall 161 is welded at its upstream end 161*a* to a lower minor-arc part 122*a* of a circular end plate 122 of the catalyst combustor 111, and vertically flanged at its downstream end 161*b*. The inlet tube 17 is inserted and welded to the minor-arc part 122*a* of the end plate 122. The inlet tubes 18 and 19 are inserted and welded to an upper major-arc part 122*b* of the end plate 122.

As shown in FIG. 5 to FIG. 7, the lower catalyst combustion portion 120 is constituted with: the lower minor-arc part 122*a* of the circular end plate 122; a lower minor-arc part 242 of a later-described cylindrical upstream casing 142 that cooperates with the separation wall 161 and the minor-arc part 122*a* of the end plate 122 to define the lower gas chamber 121; a later-described flat heat insulating separator 132 between the lower and upper accommodation chambers 131 and 151; a lower minor-arc part 252 of a later-described cylindrical downstream case 152 that cooperates with the heat insulating separator 132 to define the lower accommodation chamber 131; and a minor-arc-shape lower substrate 133 which is accommodated to be fitted gas-tight in the lower accommodation chamber 131, and formed (to be meshed) in a honeycomb shape (in like fashion to FIG. 8) with a set of axially extending catalyst combustion path (or mesh) parts "134-n (1≦n≦N)" (hereafter sometimes collectively referred to "134").

The upstream casing 142 has at its upstream end an outward flanged part 142*a* fastened by bolts 149 to a peripheral flange 122*c* of the end plate 122, and at its downstream end an inward projected part 142*b* and an outward flanged part 142*c*.

The rectangular separation wall 161 is contacted and welded at its left and right sides 161*c* on and to the cylindrical upstream casing 142.

The heat insulating separator 132 is constituted with a flat rectangular plate 132*a* which is brought into abutment at its upstream end 132*a*1 on the flanged downstream end 161*b* of the separation wall 161 and bent downward at its downstream end 132*a*2 for hooking or stopping the substrate 133, a lower heat insulating layer 132*b* which is formed over a downside of the rectangular plate 132*a*, and an upper heat insulating layer 132*c* which is formed over an upside of the plate 132*a*.

The downstream case 152 is constituted with: a cylindrical downstream casing 152*a* which is integrally formed at its upstream end with an outward flanged part 152*a*1 fastened by bolts 159 to the flanged part 142*c* of the upstream casing 142 and at its downstream end with an inward projected part 152*a*2 configured to hook or stop the before-mentioned lower substrate 33 and a later-described upper substrate 53 and with a downstream extension 152*a*3 configured to define a cylindrical combustion product (heat medium) outlet space 170 to be common to the lower and upper catalyst combustion portions 120 and 140 and to be connected to a heat medium supply line (LS3 in FIG. 1); a refractory mortar layer (similar to 52*b* in FIG. 8) lining over an inside of the downstream casing 152*a* and a corresponding region of an end face of the inward projected part 142*b* of the upstream casing 142; and a gas-tight filler (similar to 52*c* in FIG. 8) of heat insulating materials filled between the refractory mortar layer and the upper and lower substrates 133 and 153.

The rectangular plate 132*a* of the heat insulating separator 132 is contacted and welded at its left and right sides 132*a*3 on and to the cylindrical casing 152*a* of the downstream case 152.

Again as shown in FIG. 5 to FIG. 7, the upper catalyst combustion portion 140 is constituted with: an upper major-arc part 342 of the cylindrical upstream casing 142 that cooperates with the separation wall 161 and the major-arc part 122*b* of the end plate 122 to define the upper gas chamber 141; an upper major-arc part 352 of the cylindrical downstream case 152 that cooperates with the heat insulating separator 132 to define the upper accommodation chamber 151; and a major arc shape upper substrate 153 which is accommodated to be fitted gas-tight in the accommodation chamber 151, and formed (to be meshed) in a honeycomb shape (in like fashion to FIG. 8) with a set of axially extending catalyst combustion path (or mesh) parts "154-m ($1 \leqq m \leqq M$ (>N or >>N))" (hereafter sometimes collectively referred to "154"). The upper substrate 153 has a smaller mesh than the lower substrate 133, or in other words, the meshing of the latter 133 is coarser or rougher than that of the former 153.

The heat capacity of the lower catalyst combustion portion 120 substantially depends on a heat capacity of the lower substrate 133, and that of the upper catalyst combustion portion 140 substantially depends on a heat capacity of the upper substrate 153. The lower substrate 133 has a significantly smaller heat capacity than the upper substrate 153.

As schematically shown in FIG. 2 and FIG. 4 (or like the case of FIG. 8), an arbitrary catalyst combustion path part 134-n ($1 \leqq n \leqq N$) in the lower substrate 133 is constituted with: a corresponding straight combustion path 135-n ($1 \leqq n \leqq N$) (hereafter sometimes collectively referred to "135") axially extending as a fluid path through the substrate 133 and communicating at its upstream end with the lower gas chamber 121 and at its downstream end with the combustion product outlet space 170; and a corresponding set 136-n ($1 \leqq n \leqq N$) of films of a catalyst configured as a whole to define the combustion path 135-n with a corresponding fluid resistance $\{r_n: 1 \leqq n \leqq N\}$ thereacross. A parallel connection of respective fluid resistances $\{r_n\}$ of a total of N combustion paths 135 (or of N combustion path parts 134) represents a fluid resistance $R_{13}$ across the lower accommodation chamber 131 (or of the lower substrate 133).

Likewise, an arbitrary catalyst combustion path part 154-m ($1 \leqq m \leqq M$) in the upper substrate 153 is constituted with: a corresponding straight combustion path 155-m ($1 \leqq m \leqq M$) (hereafter sometimes collectively referred to "155") axially extending as a fluid path through the substrate 153 and communicating at its upstream end with the upper gas chamber 141 and at its downstream end with the combustion product outlet space 170; and a corresponding set 156-m ($1 \leqq m \leqq M$) of films of the above-noted catalyst configured as a whole to define the combustion path 155-m with a corresponding fluid resistance $\{r_m: b \leqq m \leqq M\}$ thereacross. A parallel connection of respective fluid resistances $\{r_m\}$ of a total of M combustion paths 155 (or of M combustion path parts 154) represents a fluid resistance $R_{15}$ across the upper accommodation chamber 151 (or of the upper substrate 153).

The N combustion paths 134 have a greater average sectional area than the M combustion paths 154, so that an average of the fluid resistances $\{r_n\}$ of the former 134 is smaller than that of the fluid resistances $\{r_m\}$ of the latter 154. The combustion paths 134 as well as the combustion paths 154 may be identical or different in configuration and/or size, as necessary for facilitation of manufacture or for a particular fluid condition. It is desirable to increase a proportion of effectively used catalyst in a sum of a total of N sets 136 and a total of M sets 156 of films of catalyst, in order for a capacity of catalyst combustion process to be maximized in a regular operation of the fuel cell system 1.

Referring to FIG. 5, in the catalyst combustor 111, the lower catalyst combustion portion 120 has a fluid resistance $R_L$ and thereacross equivalent to a serial connection of the fluid resistance $R_{12}$ of the lower gas chamber 121 and the fluid resistance $R_{13}$ across the lower accommodation chamber 131 (or of the lower substrate 133), such that $R_L=R_{12}+R_{13}$. The upper catalyst combustion portion 140 has a fluid resistance $R_U$ thereacross equivalent to a serial connection of the fluid resistance $R_{14}$ of the upper gas chamber 141 and the fluid resistance $R_{15}$ across the upper accommodation chamber 151 (or of the upper substrate 153), such that $R_U=R_{14}+R_{15}$. The fluid resistance $R_{16}$ of the fluid communication portion 160 is serially connected to the fluid resistance $R_{12}$ of the lower gas chamber 121.

Referring to FIG. 5 to FIG. 7 (and FIG. 1), the catalyst combustor 111 is configured to have fixed relationships among internal fluid resistances $\{R_L, R_U, R_{12}, R_{13}(r_n), R_{14}, R_{15}(r_m), R_{16}(r_i)\}$ thereof, for example such that:

$R_{12}<R_{13}$ or $R_{12}<<R_{13}$, $R_{14}<R_{15}$ or $R_{14}<<R_{15}$, $R_{12}=R_{14}<R_{16}$ or $R_{12}=R_{14}<<R_{16}$, i.e. $(R_{12}+R_{16})=(R_{14}+R_{16})=R_{16}$, $r_n<r_m$ or $r_n<<r_m$, $R_L<R_U$ or $R_L<<R_U$, and/or $R_L+R_{16}=R_U$ or $R_L+R_{16}=R_U$, so that, in a "startup operation" of the fuel cell system 1, substantially, a warming catalyst combustion between a substitute fuel and a substitute oxidizer is caused to occur simply in the lower catalyst combustion portion 120 (or more specifically in the lower substrate 133), i.e. without an influential or significant catalyst combination caused between a fuel and an oxidizer conducted in the substrate 153 of the upper catalyst combustion portion 140, and that, in a "regular operation" of the fuel cell system 1, a regular catalyst combustion between an effluent fuel and an effluent oxidizer is caused to occur in both the lower catalyst combustion portion 120 (or more specifically in the lower substrate 133) and the upper catalyst combustion portion 140 (or more specifically in the upper substrate 153), in particular proportionally or evenly, as required.

This second embodiment has like advantages to the previous first embodiment, and an additional advantage such that an axial introduction of effluent fuel and effluent oxidizer to a major arc shape upper catalyst gas chamber 141 permits a faster and efficient regular catalyst combustion.

The lower catalyst combustion portion (120) may comprise a lower gas chamber 21 and a lower substrate 133. Likewise, the upper catalyst combustion portion (140) may comprise an upper gas chamber 41 and an upper substrate 153. Then, the catalyst combustor 111 may have a combination (142+152) of a cylindrical upstream casing 142 and a cylindrical downstream case 152 with a flat heat insulating separator 132, as a cylindrical enclosure (142+152) circumscribed about the upper and lower catalyst combustion portions (120 and 140).

In the first and second embodiments, an arbitrary or particular combustion path 35, 55, 135, or 155 may be configured in any form else, as necessary, for facilitation of manufacture or for a particular fluid condition, in particular for a velocity of a gaseous mixture of substitute or effluent fuel and oxidizer to be faster at an upstream end, where fuel concentration is relatively high, than at a downstream end, where fuel concentration is relatively low, in order for the catalyst combustion to be possibly uniform in both startup and regular operations over lengths of combustion paths in the inner or lower and outer or upper substrates 33 or 133 and 53 or 153, and further for the catalyst warming to be possibly even in the startup operation over lengths of combustion paths in the inner or lower substrate 33 or 133.

Figure 9:
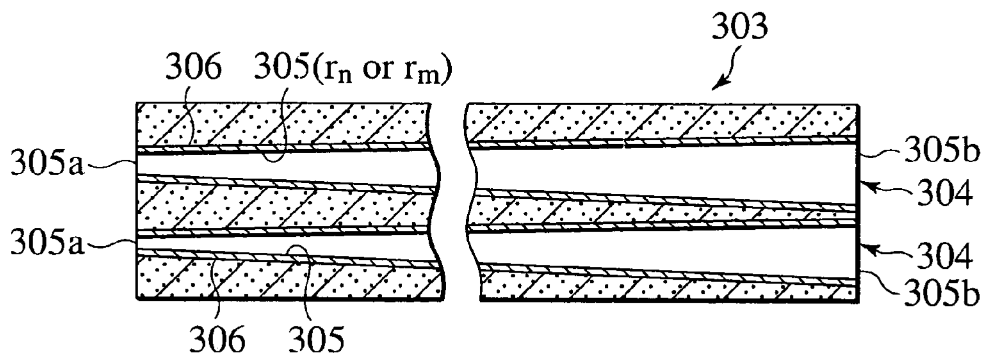
FIG. 9 shows in section an essential part of a catalyst combustion portion as a modification of each embodiment.
Figure 10:
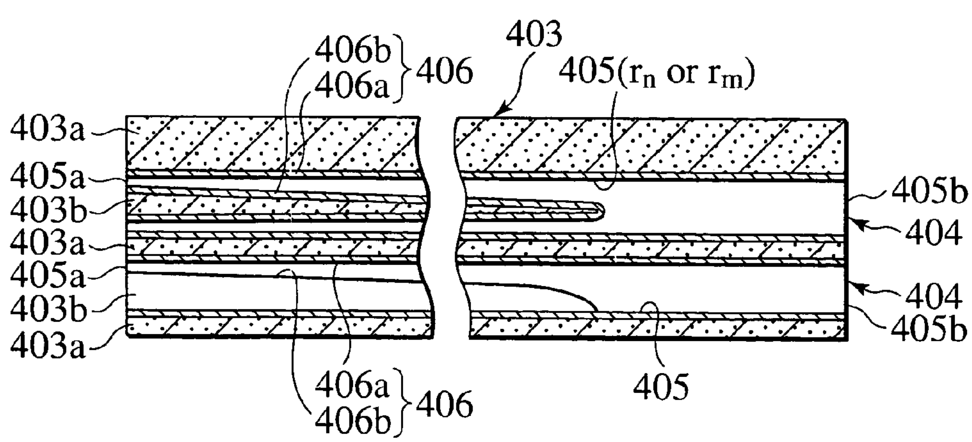
FIG. 10 shows in section an essential part of a catalyst combustion portion as another modification of each embodiment.

To this point, FIG. 9 and FIG. 10 show path parts 304 and 404, respectively, as modification of an arbitrary pair or particular (for example, central or peripheral) pair of neighboring combustion path parts 34, 54, 134, or 154.

In the modifications of FIG. 9, each path part 304 is constituted with: a corresponding elongate conical combustion path 305 axially extending as a fluid path through a substrate 303, having a greater sectional area at an upstream end 305*a* thereof than at a downstream end 305*b* thereof; and a corresponding set 306 of films of a catalyst configured as a whole to define the combustion path 305 with a corresponding fluid resistance $r_n$ or $r_m$ thereacross.

In the modification of FIG. 10, each path part 404 is constituted with: a corresponding tubular combustion path 405 axially extending as a fluid path through a base portion 403*a* of a substrate 403, having a greater sectional area at an upstream end 405*a* thereof than at a downstream end 405*b* thereof, as it is achieved by provision of a raised part 403*b* of the substrate 403 extending along the combustion path 405, from the upstream end 405*a* to an axially intermediate point, with a gradually reduced width; and a combination 406 of a corresponding set 406*a* of films of a catalyst formed on a wall of the base portion 403*a* of the substrate 403 and a conformal set 406*b* of films of the catalyst formed on the raised part 403*b* of the substrate 403, as they (406*a*, 406*b*) are configured as a whole to define the combustion path 405 with a corresponding fluid resistance $r_n$ or $r_m$ thereacross.

In the foregoing embodiments, it should be noted that the control valve CV1 of the air supply line LS2 may be controlled to a reduced open or crack-open in the effectively warmed phase in the startup operation of the fuel cell system 1. In this case, an effluent oxidizer is supplied through the supply line LS24 during the effectively warmed phase and the sufficiently warmed phase, i.e., over the warmed phase. However, the fluid resistance relationship described causes the effluent oxidizer in the effectively warmed phase to flow like that in the regular operation, without extra control.

It will be seen that the shutoff valves SV1 to SV3 as well as control valves CV1 to CV3 may be controlled for a regular operation of the fuel cell system 1 to cover an entirety of the warmed phase.

It is noted that in each embodiment described the fuel source of the catalyst combustor 11 may be different from that of the fuel reformer 5, and the air source of the catalyst combustor 11 may be different from that of the fuel reformer 5 and/or the fuel cell 2. The substitute fuel may be any fuel else, if it is gaseous, when supplied in the combustor 11, and combustible by contact on the catalyst, with sufficient combustion products to provide an adequate amount of effective heat medium. The substitute oxidizer may be any oxidizer else, if it is gaseous, when supplied in the combustor 11, and active enough in oxidization to promote the catalyst combustion.

The contents of Japanese Patent Application no. 2000-41194 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A catalyst combustion system comprising:

a closable first fuel supply line which supplies a fluid containing a first fuel;

a closable first oxidizer supply line which supplies a fluid containing a first oxidizer for the first fuel to be combustible therewith under assistance of a catalyst;

a second fuel supply line which supplies a fluid containing a second fuel different from the first fuel;

a second oxidizer supply line which supplies a fluid containing a second oxidizer for the second fuel to be combustible therewith under assistance of the catalyst; and a catalyst combustor configured to alternately perform a first catalyst combustion between the first fuel and the first oxidizer and a second catalyst combustion between the second fuel and the second oxidizer, and to supply as a thermal medium a fluid containing one of a combustion product of the first catalyst combustion and a combustion product of the second catalyst combustion to the system, wherein the catalyst combustor comprises a first catalyst combustion portion connected to the first fuel supply line and the first oxidizer supply line, a second catalyst combustion portion connected to the second fuel supply line and the second oxidizer supply line, and a fluid communication portion between the first catalyst combustion portion and the second catalyst combustion portion, which connects the first catalyst combustion portion and the second catalyst combustion portion in fluid communication with each other, wherein the first catalyst combustion portion and the second catalyst combustion portion have predetermined fluid resistances, wherein the first catalyst combustion takes place only in the first catalyst combustion portion, as the fluid containing the first fuel and the fluid containing the first oxidizer are supplied to the first catalyst combustion portion, and the second catalyst combustion takes place in both the first and second catalyst combustion portions, as the fluid containing the second fuel and the fluid containing the second oxidizer are supplied to the second catalyst combustion portion.

2. A catalyst combustion system according to claim 1, wherein the fluid resistance of the second catalyst combustion portion is greater than the fluid resistance of the first catalyst combustion portion.

3. A catalyst combustion system comprising:

a closable first fuel supply line which supplies a fluid containing a first fuel;

a closable first oxidizer supply line which supplies a fluid containing a first oxidizer for the first fuel to be combustible therewith under assistance of a catalyst;

a second fuel supply line which supplies a fluid containing a second fuel different from the first fuel;

a second oxidizer supply line which supplies a fluid containing a second oxidizer for the second fuel to be combustible therewith under assistance of the catalyst; and a catalyst combustor configured to alternately perform a first catalyst combustion between the first fuel and the first oxidizer and a second catalyst combustion between the second fuel and the second oxidizer, and to supply as a thermal medium a fluid containing one of a combustion product of the first catalyst combustion and a combustion product of the second catalyst combustion to the system, wherein the catalyst combustor comprises a first catalyst combustion portion connected to the first fuel supply line and the first oxidizer supply line, a second catalyst combustion portion connected to the second fuel supply line and the second oxidizer supply line, and a fluid communication portion between the first catalyst combustion portion and the second catalyst combustion portion, which connects the first catalyst combustion portion and the second catalyst combustion portion in fluid communication with each other, wherein the first catalyst combustion portion and the second catalyst combustion portion have predetermined fluid resistances, wherein the first catalyst combustion takes place only in the first catalyst combustion portion, as the fluid containing the first fuel and the fluid containing the first oxidizer are supplied to the first catalyst combustion portion, and the second catalyst combustion takes place in both the first and second catalyst combustion portions, as the fluid containing the second fuel and the fluid containing the second oxidizer are supplied to the second catalyst combustion portion, wherein the fluid resistance of the second catalyst combustion portion is substantially equal to a sum of the fluid resistance of the first catalyst combustion portion and a fluid resistance of the fluid communication portion.

4. A catalyst combustion system comprising:

a closable first fuel supply line which supplies a fluid containing a first fuel;

a closable fist oxidizer supply line which supplies a fluid containing a first oxidizer for the first fuel to be combustible therewith under assistance of a catalyst;

a second fuel supply line which supplies a fluid containing a second fuel different from the first fuel;

a second oxidizer supply line which supplies a fluid containing a second oxidizer for the second fuel to be combustible therewith under assistance of the catalyst; and a catalyst combustor configured to alternately perform a first catalyst combustion between the first fuel and the first oxidizer and a second catalyst combustion between the second fuel and the second oxidizer, and to supply as a thermal medium a fluid containing one of a combustion product of the first catalyst combustion and a combustion product of the second catalyst combustion to the system, wherein the catalyst combustor comprises a first catalyst combustion portion connected to the first fuel supply line and the first oxidizer supply line, a second catalyst combustion portion connected to the second fuel supply line and the second oxidizer supply line, and a fluid communication portion between the first catalyst combustion portion and the second catalyst combustion portion, which connects the first catalyst combustion portion and the second catalyst combustion portion in fluid communication with each other, wherein the first catalyst combustion portion and the second catalyst combustion portion have predetermined fluid resistances, wherein the first catalyst combustion takes place only in the first catalyst combustion portions, as the fluid containing the first fuel and the fluid containing the first oxidizer are supplied to the first catalyst combustion portion, and the second catalyst combustion takes place in both the first and second catalyst combustion portions, as the fluid containing the second fuel and the fluid containing the second oxidizer are supplied to the second catalyst combustion portion, wherein the first catalyst combustion portion comprises a first gas chamber connected to the first fuel supply line and the first oxidizer supply line, a first set of catalyst combustion path parts connected to the first gas chamber, a first substrate formed with the first set of catalyst combustion path parts, and a heat insulating first accommodation part which accommodates the first substrate, the fluid resistance of the first catalyst combustion portion is representative of a sum of a fluid resistance of the first gas chamber and a fluid resistance of the first set of catalyst combustion path parts, the second catalyst combustion portion comprises a second gas chamber connected to the second fuel supply line and the second oxidizer supply line, a second set of catalyst combustion path parts connected to the second gas chamber, a second substrate formed with the second set of catalyst combustion path parts, and a heat insulating second accommodation part which accommodates the second substrate, and the fluid resistance of the second catalyst combustion portion is representative of a sum of a fluid resistance of the second gas chamber and a fluid resistance of the second set of catalyst combustion path parts.

5. A catalyst combustion system according to claim 4, wherein the first set of catalyst combustion path parts comprises a first set of combustion paths communicating with the first gas chamber, and a first set of films of the catalyst configured to define the first set of combustion paths, the fluid resistance of the first set of catalyst combustion path parts is representative of a fluid resistance of the first set of combustion paths, the second set of catalyst combustion path parts comprises a second set of combustion paths communicating with the second gas chamber, and a second set of films of the catalyst configured to define the second set of combustion paths, and the fluid resistance of the second set of catalyst combustion path parts is representative of a fluid resistance of the second set of combustion paths.

6. A catalyst combustion system according to claim 5, wherein the first set of combustion paths comprises a first plurality of straight fluid paths provided through the first substrate, the second set of combustion paths comprises a second plurality of straight fluid paths provided through the second substrate, the second plurality being greater than the first plurality, and the first plurality of straight fluid paths has a greater average sectional area than the second plurality of straight fluid paths.

7. A catalyst combustion system according to claim 5, wherein the first set of combustion paths includes a combustion path having a greater sectional area at an upstream end thereof than at a downstream end thereof.

8. A catalyst combustion system according to claim 4, wherein the fluid communication portion comprises a separation wall configured to separate the first gas chamber from the second gas chamber, and a set of through holes formed in the separation wall, and the fluid resistance of the fluid communication portion is representative of a fluid resistance of the set of through holes.

9. A catalyst combustion system according to claim 1, wherein the first catalyst combustion portion has a smaller heat capacity than the second catalyst combustion portion.

10. A catalyst combustion system comprising:

a closable first fuel supply line which supplies a fluid containing a first fuel;

a closable fist oxidizer supply line which supplies a fluid containing a first oxidizer for the first fuel to be combustible therewith under assistance of a catalyst;

a second fuel supply line which supplies a fluid containing a second fuel different from the first fuel;

a second oxidizer supply line which supplies a fluid containing a second oxidizer for the second fuel to be combustible therewith under assistance of the catalyst; and a catalyst combustor configured to alternately perform a first catalyst combustion between the first fuel and the first oxidizer and a second catalyst combustion between the second fuel and the second oxidizer, and to supply as a thermal medium a fluid containing one of a combustion product of the first catalyst combustion and a combustion product of the second catalyst combustion to the system, wherein the catalyst combustor comprises a first catalyst combustion portion connected to the first fuel supply line and the first oxidizer supply line, a second catalyst combustion portion connected to the second fuel supply line and the second oxidizer supply line, and a fluid communication portion between the first catalyst combustion portion and the second catalyst combustion portion, which connects the first catalyst combustion portion and the second catalyst combustion portion in fluid communication with each other, wherein the first catalyst combustion portion and the second catalyst combustion portion have predetermined fluid resistances, wherein the first catalyst combustion takes place only in the first catalyst combustion portion, as the fluid containing the first fuel and the fluid containing the first oxidizer are supplied to the first catalyst combustion portion, and the second catalyst combustion takes place in both the first and second catalyst combustion portions, as the fluid containing the second fuel and the fluid containing the second oxidizer are supplied to the second catalyst combustion portion wherein the first catalyst combustion portion has a smaller heat capacity than the second catalyst combustion portion and wherein the catalyst combustor has a heat insulating layer interposed between the first catalyst combustion portion and the second catalyst combustion portion.

11. A catalyst combustion system according to claim 1, wherein the first catalyst combustion portion is enclosed by the second catalyst combustion portion.

12. A catalyst combustion system according to claim 1, wherein the catalyst combustor has a substantially cylindrical enclosure circumscribed about the first catalyst combustion portion and the second catalyst combustion portion.

13. A catalyst combustion system according to claim 1, further comprising a separation wall disposed between the first catalyst combustion portion and the second catalyst combustion portion.

14. A catalyst combustion system according to claim 13, wherein the fluid communication portion comprises an opening through the separation wall.

15. A catalyst combustion system according to claim 14, wherein the fluid communication portion comprises an array of openings through the separation wall.

16. A catalyst combustion system according to claim 15, wherein at least one hole is circular, elliptic, triangular, rectangular or polygonal.

* * * * *